March 26, 1963  R. R. CAMPFIELD  3,083,007
WOOD FRAMING CLAMP
Filed May 17, 1961  2 Sheets-Sheet 1
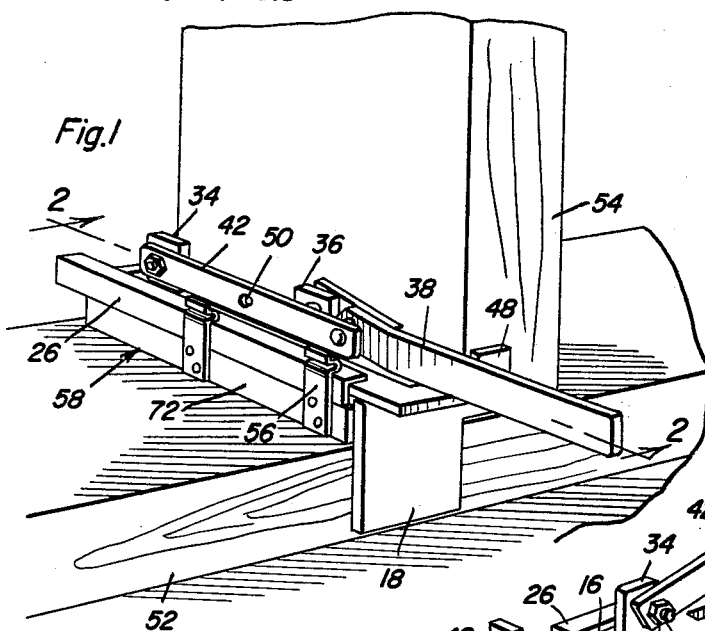
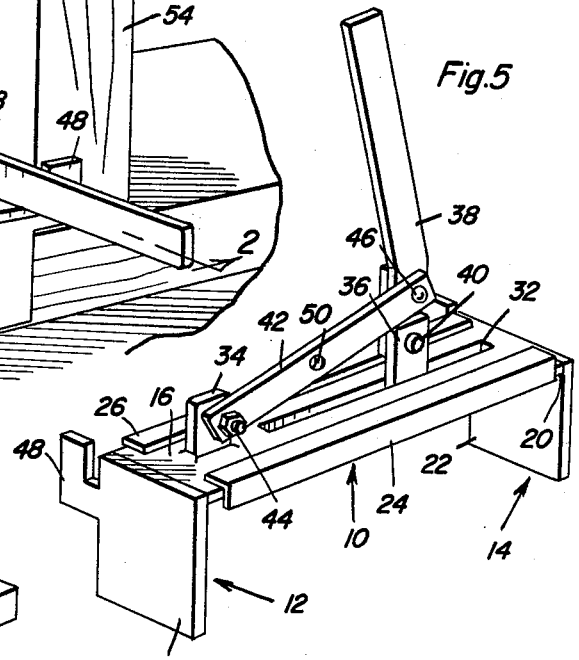
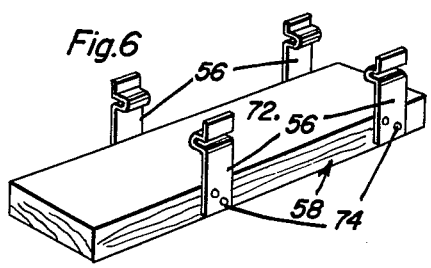
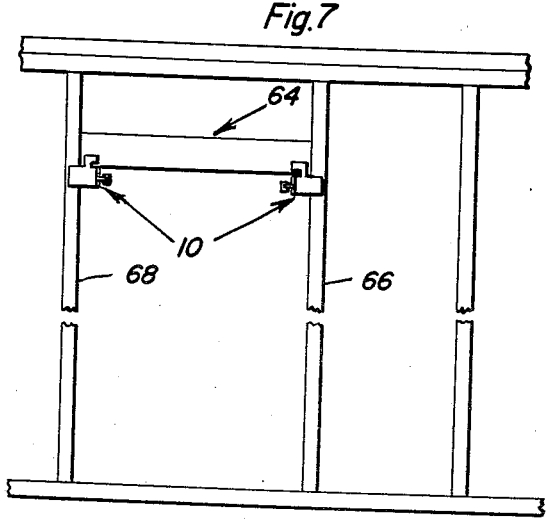
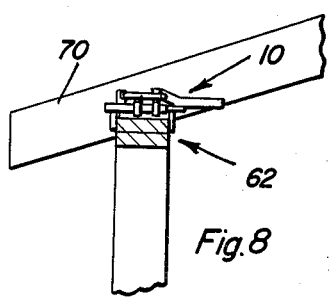
Rudolph R. Campfield
INVENTOR.
BY *Clarence A. O'Brien*
and *Harvey B. Jacobson*
Attorneys March 26, 1963 R. R. CAMPFIELD 3,083,007
WOOD FRAMING CLAMP
Filed May 17, 1961 2 Sheets-Sheet 2
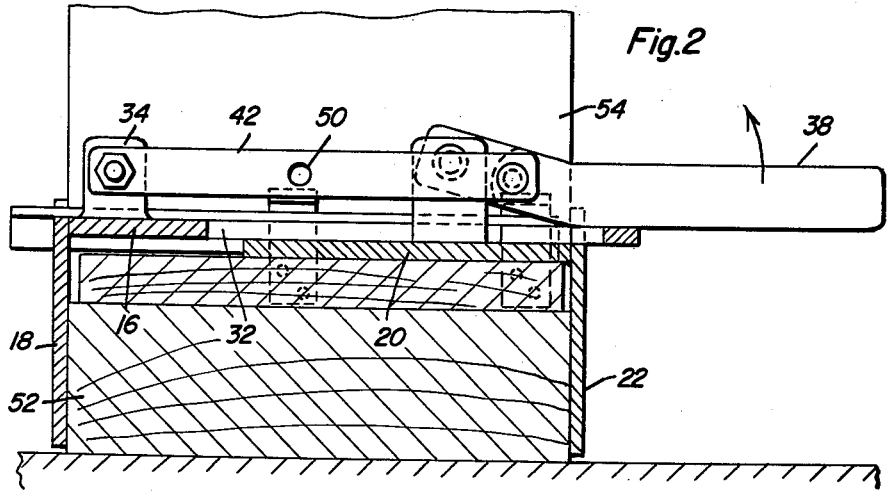
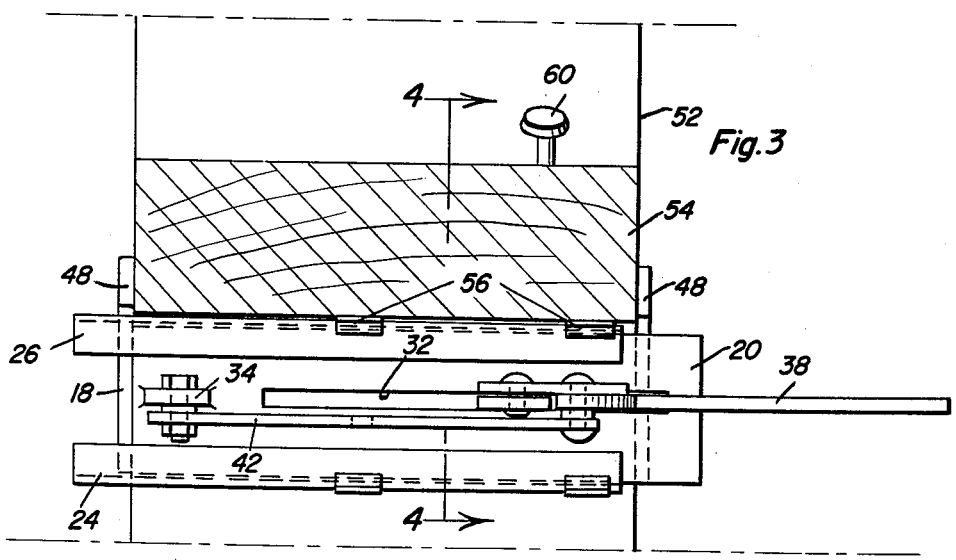
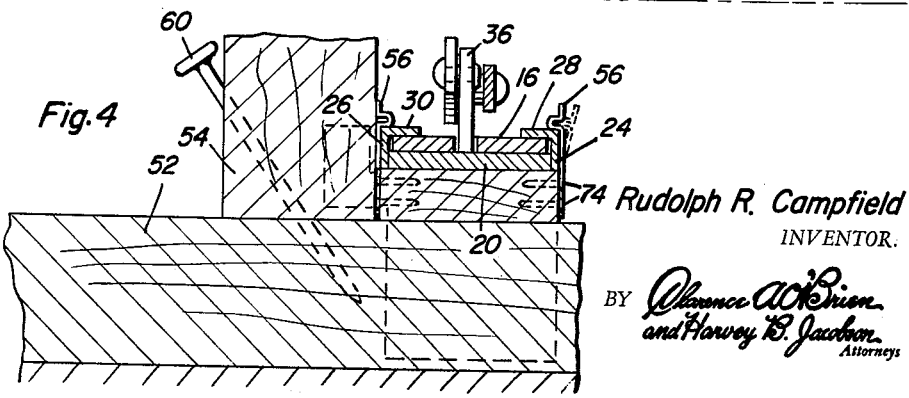
Rudolph R. Campfield
INVENTOR.

United States Patent Office 3,083,007
Patented Mar. 26, 1963

1

3,083,007
WOOD FRAMING CLAMP
Rudolph R. Campfield, Rte. 2, Palmyra, Mo.
Filed May 17, 1961, Ser. No. 110,728
3 Claims. (Cl. 269—151)

This invention relates to a wood framing clamp and more specifically to a clamp specifically adapted for maintaining a pair or more framing members properly orientated relative to each other during securement of the framing members together by nailing. The framing clamp of the instant invention may be utilized to retain substantially all types of angulated framing members properly orientated relative to each other during the nailing of one of the framing members to the other. Additionally, the framing clamp of the instant invention may be utilized to straighten one warped framing member as it is being secured to another framing member in order to form a double framing member.

The main object of this invention is to provide a wood framing clamp which may be utilized by carpenters and other similar workmen in the building industry to maintain a loose vertical framing member such as a stud in position relative to a plate member to which the stud is to be secured by nailing.

A further object of this invention, in accordance with the immediately preceding object, is to provide a wood framing clamp which may be utilized to properly support a header member between two adjacent stud members until such time as the header member can be nailed in place between the stud members thereby enabling loose lumber such as a header member to be maintained stationary relative to the stud members between which the header member is to be secured in order that both hands of a carpenter may be free to hammer a nail home.

A final object to be specifically enumerated herein is to provide a device in accordance with the preceding objects which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in whch:

FIGURE 1 is a perspective view of the wood framing clamp of the instant invention shown being used to hold a stud framing member in position relative to a plate framing member in order that the former may be secured to the latter by nailing without the two members shifting relative to each other;

FIGURE 2 is a longitudinal vertical sectional view taken substantially upon the plane indicated by the section line 2—2 of FIGURE 1 and on somewhat of an enlarged scale;

FIGURE 3 is a horizontal sectional view taken through the stud framing member illustrated in FIGURE 2 and looking down upon the wood framing clamp;

FIGURE 4 is a vertical sectional view taken substantially upon the plane indicated by the section line 4—4 of FIGURE 3;

FIGURE 5 is a perspective view of the wood framing clamp;

FIGURE 6 is a perspective view of a spacing block attachment adapted to be used in connection with the wood framing clamp in order to shorten the effective length of the jaws of the clamp;

FIGURE 7 is a side elevational view of a section of building framing with two of the wood framing clamps being utilized to secure a header member between two adjacent stud members; and FIGURE 8 is a vertical sectional view taken through a header plate extending along the upper portion of a wall and showing the manner in which the wood framing clamp of the instant invention may be utilized to maintain a rafter in position relative to the header plate during nailing of the rafter to the header plate.

Referring now more specifically to the drawings the numeral 10 generally designates the wood framing clamp of the instant invention. It may be seen from FIGURES 2–5 that the wood framing clamp comprises a pair of generally L-shaped members 12 and 14. The L-shaped member 12 includes a guide leg 16 and an angulated laterally directed jaw leg 18 whereas the L-shaped member 14 also includes a guide leg designated by the reference numeral 20 and a jaw leg 22 substantially identical to the jaw leg 18. Each of the legs 16, 18, 20 and 22 is substantially plate-like and it will be noted from FIGURE 4 of the drawings that the guide leg 20 has a pair of generally L-shaped flanges 24 and 26 secured to the opposite side edges thereof and including inturned free end portions 28 and 30 respectively which overlie the marginal edge portions of the guide leg 16 on the side thereof remote from the guide leg 20. In this manner, the L-shaped members 12 and 14 are secured together with the guide legs disposed in sliding contacting overlapping relation and for movement of the jaw legs 18 and 22 toward and away from each other while being maintained substantially parallel. The guide leg 16 has a longitudinally extending slot 32 formed therein and a first apertured mounting lug 34 projects from the side of the guide plate 16 remote from the guide plate 20. A second mounting lug 36 projects from the guide leg 20 and extends through the slot 32. One end of a lever arm 38 is pivotally secured to the second mounting lug as at 40 for movement about an axis extending transversely of the legs 16 and 20 and one end of a connecting link 42 is pivotally secured to the first mounting lug 34 as at 44 for movement about an axis generally paralleling the axis of rotation of the lever arm 38. The other end of the connecting link 42 is pivotally secured to the lever arm 38 as at 46 a spaced distance from its pivotal connection with the mounting lug 36 and for movement about an axis paralleling the axis of rotation of the lever arm 38. Accordingly, the lever arm 38 may be utilized to urge the jaw legs 18 and 22 toward and away from each other. It will be noted that each of the L-shaped flanges 24 and 26 defines a straight edge extending along opposite side edges of the clamp 10 and further that each of the jaw legs 18 and 22 is provided with an abutment flange 48 which projects outwardly from one side edge of the corresponding jaw leg and is coplanar with the latter. It may be observed from FIGURES 1, 3 and 4 of the drawings that the abutment flanges are adapted to embrace the opposite side edges of a framing member which is to be secured to a framing member which is clampingly engaged between the jaw legs 18 and 20.

It will be noted that the connecting link 42 includes a centrally disposed aperture 50 and that the aperture 50 may be utilized to define the pivotal connection 46 whereby the maximum and minimum spatial relationship of the jaw legs 18 and 20 may be adjusted.

From FIGURES 3 and 4 of the drawings it may be observed that the clamping legs 18 and 22 may be utilized to clampingly engage the opposite side edges of a plate member 52 and that at the same time the flange 48 may be utilized to clampingly engage the opposite side edges of a stud member 54. The clamping engagement of the jaw legs 18 and 22 with the plate 52 will prevent movement of the clamp longitudinally of the plate 52 and thus it may be observed that the side face of the stud member 54 may abut against the outer surfaces of the spring clips 56 which are utilized to secure the spacing block attachment generally referred to by the reference numeral 58 to the framing clamp 10. If the spacing block attachment 58 is not being used, the side face of the stud 54 may be abutted against the outer face of the L-shaped flange 26. In this manner, the nail 60 may be hammered from the side of the stud 54 remote from the clamp 10 and the clamp 10 will prevent shifting of the end of the stud 54 longitudinally of the plate 52 in the direction in which the nail 60 is being hammered.

If it is desired to utilize the clamp 10 in straightening one framing member relative to another framing member as the two framing members are being secured together by nailing, the spacing block attachment 58 may be removed in order that the effective length of the jaw legs 18 and 22 may be increased so as to enable them to embracingly engage the opposite side edges of two framing members disposed in stacked relation such as is conventional in the forming of header members such as that illustrated in FIGURE 8 of the drawings and generally designated by the reference numeral 62.

In FIGURE 7 of the drawings there may be seen a pair of clamps 10 being utilized to support a header member generally referred to by the reference numeral 64 between adjacent stud members 66 and 68 in order that a carpenter or workman may have both hands available for nailing the header member in place.

In FIGURE 8 of the drawings it may be observed that the clamp 10 is engaged with the double header member 62 and that the rafter member 70 has its side face adjacent the clamp 10 abutted against the free ends of the flanges 48. In this manner, the clamp 10 may be utilized to clampingly engage the double header member 62 and prevent the rafter member 70 from shifting longitudinally of the double header member in the direction of the clamp 10 as the rafter member 70 is being nailed from the side thereof remote from the clamp 10.

From FIGURE 4 of the drawings it will be observed that the spring clips 56 may be urged apart at their free ends in order to remove the spacing block attachment from the framing clamp 10. The spring clips 56 may be secured to the spacing block 72 of the attachment 58 in any convenient manner such as by nails 74.

From FIGURES 1 and 2 of the drawings it will be noted that the lever arm 38 is capable of being moved to an over center position which will maintain the clamp 10 in clamping engagement with the plate 52 and stud 54. The aperture 50 is located longitudinally of the connecting link 42 in order that the clamp 10 may be used in connection with the next size smaller framing members smaller than the framing members 52 and 54. The effective length of the connecting link 42 is such that the jaw legs 18 and 22 will be in tight frictional engagement with the corresponding size of framing members when the lever arm 38 is disposed in its over center position. Accordingly, once the clamp 10 has been secured in place, it may be left unattended and yet may be quickly disengaged or released.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wood framing clamp for maintaining a pair or more framing members properly orientated relative to each other during securement of the framing members together by nailing, said framing clamp comprising a pair of plate-like generally L-shaped members each including a guide leg and a substantially right angled laterally directed jaw leg, means securing said L-shaped members together with the free ends of said guide legs disposed in sliding overlapping relation for movement of said jaw legs toward and away from each other while being maintained substantially parallel, means secured between said L-shaped members for urging movement of said L-shaped members relative to each other, one of said guide legs has a longitudinal slot formed therein, a first mounting lug projecting laterally from one side face of said one guide leg, a second mounting lug projecting laterally from one side face of the other guide leg and through said slot, a lever arm pivotally secured to said second lug at one end for movement about an axis extending transversely of said guide legs, said urging means comprising a connecting link having one end portion pivotally secured to said first lug for movement about an axis paralleling said first-mentioned axis and to said lever arm at the other end a spaced distance from said first-mentioned axis and for movement about an axis paralleling said first-mentioned axis.

2. The combination of claim 1, each of said jaws including an abutment flange substantially co-planar therewith and projecting laterally from the inner ends of said jaws adapted to embrace the opposite sides of an angulated framing member abutted against the side face of a framing member having its opposite side edges embraced between said jaws, said securing means including a pair of generally L-shaped flanges secured to the opposite side edges of one of said guide legs and projecting laterally therefrom and including inturned free end portions embracing the opposite side marginal edge portions of the other of said guide plates.

3. The combination of claim 2 including a spacing block attachment removably secured to one of said guide legs, disposed between said jaw legs, and extending away from said guide legs a distance less than the length of said jaw legs whereby the effective lengths of the latter are reduced, said connecting link including means for adjusting the effective length thereof.

References Cited in the file of this patent

UNITED STATES PATENTS

| | | |
|---|---|---|
| 140,136 | Holt | June 24, 1873 |
| 386,697 | Farwell | July 24, 1888 |
| 1,211,024 | Wilson et al. | Jan. 2, 1917 |
| 2,484,339 | Fuhr | Oct. 11, 1949 |
| 2,651,959 | Harrington | Sept. 15, 1953 |
| 2,868,091 | Du Bois | Jan. 13, 1959 |

FOREIGN PATENTS

| | | |
|---|---|---|
| 326,798 | Great Britain | Mar. 19, 1930 |